United States Patent [19]

Haeflich et al.

[11] 4,110,973
[45] Sep. 5, 1978

[54] WATER INJECTION SYSTEM FOR INDUSTRIAL GAS TURBINE ENGINE

[75] Inventors: Jack Haeflich; Peter C. Christman, both of West Hartford, Conn.

[73] Assignee: Energy Services Inc., Farmington, Conn.

[21] Appl. No.: 761,628

[22] Filed: Jan. 24, 1977

[51] Int. Cl.² .............................................. F02C 7/22
[52] U.S. Cl. ............................ 60/39.05; 60/39.46 S; 60/39.55; 431/4; 261/118
[58] Field of Search ............ 60/39.46 S, 39.59, 39.55, 60/39.26, 39.05, 39.3; 123/25 R, 25 A, 25 B, 25 C; 261/118, 76, 78 R, DIG. 13, DIG. 75; 431/4

[56] References Cited

U.S. PATENT DOCUMENTS

| | | |
|---|---|---|
| 3,409,274 | 11/1968 | Lawton .................................. 261/76 |
| 3,713,290 | 1/1973 | Gold ................................. 60/39.28 R |
| 3,766,942 | 10/1973 | Delatronchette et al. .............. 431/4 |
| 3,837,784 | 9/1974 | Delatronchette ........................ 431/4 |
| 3,914,348 | 10/1975 | Kors et al. ............................. 261/118 |
| 3,921,389 | 11/1975 | Kawaguchi ......................... 60/39.59 |

Primary Examiner—Robert E. Garrett
Attorney, Agent, or Firm—Prutzman, Hayes, Kalb & Chilton

[57] ABSTRACT

A gas turbine engine power plant employing a water injection system having a water/fuel mixing device for injecting water into the engine fuel as it is conducted to the engine combustion chambers. The water/fuel mixing device employs a fuel conduit with a helical arrangement of water injection apertures for injecting water jets through the fuel to impinge upon the inside wall of the conduit and mix homogeneously with the fuel.

4 Claims, 3 Drawing Figures

WATER INJECTION SYSTEM FOR INDUSTRIAL GAS TURBINE ENGINE

BRIEF SUMMARY OF THE INVENTION

The present invention relates generally to water injection systems for industrial gas turbine engines and more particularly to a new and improved water injection system for reducing the NOX emissions of industrial gas turbine engine power plants.

It is a primary aim of the present invention to provide a new and improved water injection system for an industrial gas turbine engine power plant for substantially reducing the NOX emissions.

It is another aim of the present invention to provide a new and improved water injection system of the type described which can be used with conventional gas turbine engine power plants without requiring modification or replacement of the engine fuel nozzles, manifolds and combustion cans.

It is a further aim of the present invention to provide a new and improved water injection system for injecting water into a fuel delivery conduit of a gas turbine engine in a manner providing a substantially homogeneous water/fuel mixture at each of the engine fuel nozzles and without adversely affecting engine nozzle operation.

It is another aim of the present invention to provide a new and improved water injection system for a gas turbine engine power plant which provides a substantially homogeneous water/fuel mixture with a relatively low water/fuel ratio capable of substantially eliminating the usual flame temperature spike within the engine combustion chambers and thereby substantially reduce the formation of NOX emissions. In accordance with the present invention, the water/fuel ratio is capable of being held to a relatively low level insufficient to significantly raise the CO emission and thereby maintain the CO emission within an acceptable level.

It is another aim of the present invention to provide a new and improved water injection system of the type described which requires less water than prior systems and which therefore results in better engine efficiency and lower water costs.

Other objects will be in part obvious and in part pointed out more in detail hereinafter.

A better understanding of the invention will be obtained from the following detailed description and the accompanying drawing of an illustrative application of the invention.

DESCRIPTION OF THE PREFERRED EMBODIMENT

Figure 1:
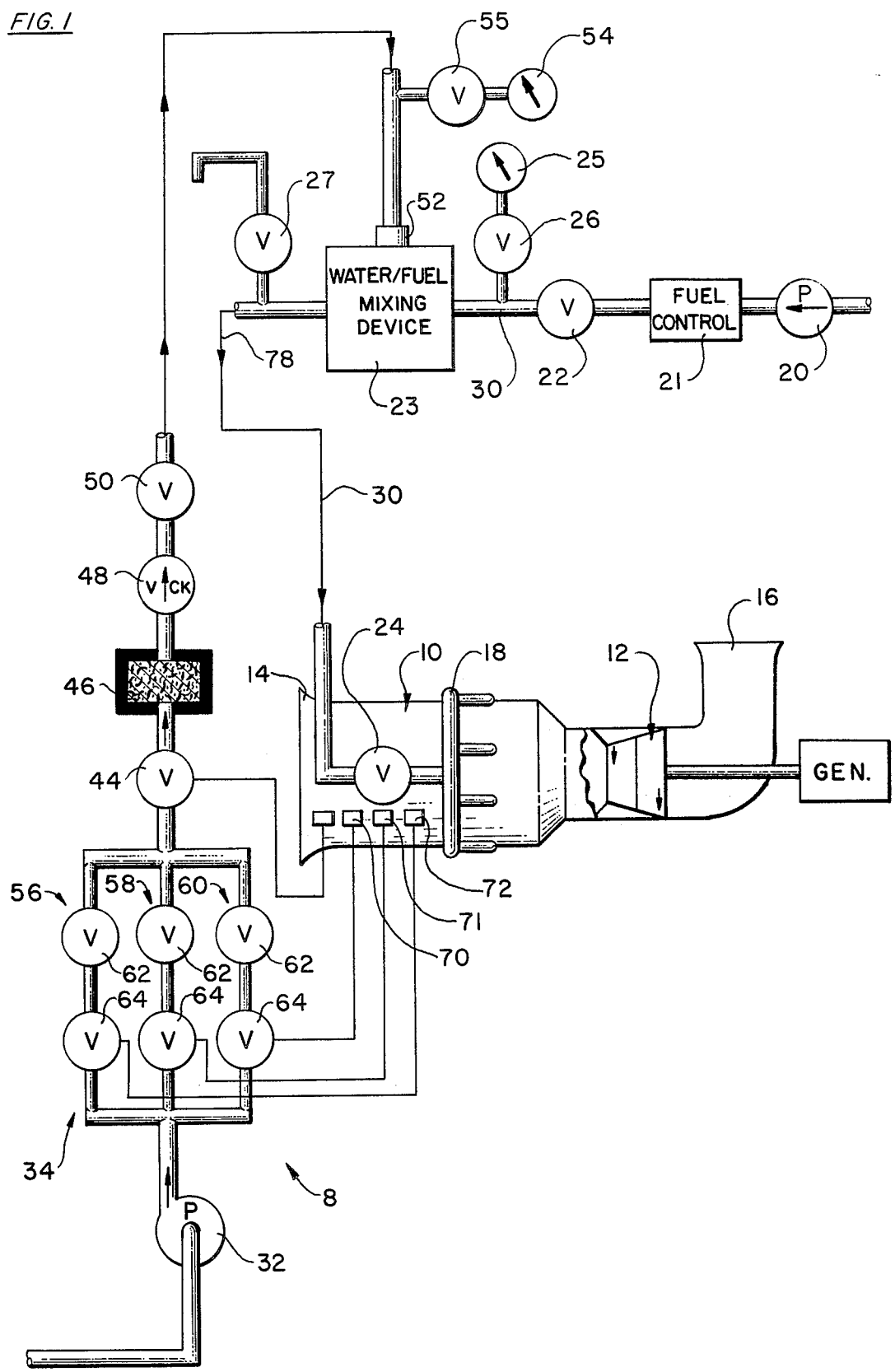
FIG. 1 is a generally diagrammatic representation, partly broken away, of an industrial gas turbine engine power plant incorporating an embodiment of a water injection system of the present invention.

Referring now to the drawings in detail wherein like numerals designate like parts, an industrial gas turbine engine power plant incorporating an embodiment 8 of a water injection system of the present invention is shown comprising a variable speed gas turbine engine or gas generator 10 aligned for operating an electric generator drive turbine 12 with the engine exhaust and having an air inlet 14 and an exhaust stack 16. Fuel is supplied to a fuel manifold 18 of the gas turbine engine 10 under pressure from a suitable source (not shown) via a suitable fuel pump 20, a fuel control 21, a fuel shutoff valve 22, a water/fuel mixing device 23 and an engine pressurizing and dump valve 24. A fuel pressure gauge 25 is connected via a valve 26 for registering the fuel inlet pressure to the water/fuel mixing device 23. Also, a manual valve 27 is shown provided for selectively collecting via a spout 28 a sample of the water/fuel mixture being delivered to the engine.

The engine fuel control 21 operates in a conventional manner to regulate the rate of fuel delivered to the engine and thereby establish the engine power setting. In a conventional manner, the fuel control 21 is conventionally set to provide continuous engine operation at a relatively fixed power setting. For example, the engine is conventionally operated at a relatively fixed level between 50% to 100% of a predetermined industrial "Base Load" power setting established in accordance with the engine operating specifications. In addition, the gas turbine engine may be operated up to an industrial "Peak Load" power setting and beyond to a "Peak Reserve Load" power setting to meet relatively short-term power requirements.

The water injection system 8 provides for supplying water, preferably demineralized water, via the mixing device 23 for being mixed with the fuel being supplied via the fuel delivery conduit 30 to the gas turbine engine 10. For that purpose, the water injection system 8 employs a suitable centrifugal pump 32 having a relatively flat-heat characteristic over the operating flow range for supplying water from a suitable water source (not shown) at a rate of, for example, up to 35 gallons/minute and at a relatively constant pressure of, for example, 875 psi via a metering system 34 to the water/fuel mixing device 23.

The outlet of the water metering system 34 is connected via a pneumatically operated shutoff valve 44, a filter 46, a one-way check valve 48, and a manually operated valve 50 to an inlet conduit 52 of the water/fuel mixing device 23. The manual valve 50 is provided for manually isolating the water injection system from the fuel system for maintenance purposes. The pneumatically operated shutoff valve 44 is suitably connected to the engine to provide for rapid and automatic valve closure in the event the engine is automatically shut down and to thereby prevent any subsequent injection of water into the hot engine which might quench and thereby damage the internal components of the engine. A water pressure gauge 54 is connected via a valve 55 for registering the water inlet pressure to the water/fuel mixing device 23.

The water metering system 34 is shown comprising in parallel three metering subsystems 56, 58, and 60 having respective manually settable metering valves 62 and pneumatically operated on/off valves 64. The metering valves 62 of the three metering subsystems are preset and calibrated to provide predetermined desired rates of water flow for predetermined engine power ranges. Thus, one of the metering subsystems is set and calibrated to provide a preestablished desired rate of water injection when the engine is operating, for example, within a 50–75% "Base Load" power range, and the remaining two metering subsystems are set and calibrated to provide preestablished desired incremental flow rate increases for predetermined successive power ranges from, for example, 75% "Base Load" to "Peak Load" and from "Peak Load" to "Peak Reserve Load" engine operating ranges respectively. Also, the pneumatically operated on/off valves 64 are suitably connected to the engine, for example, to be actuated by respective pressure switches, 70–72, responsive to the compressor discharge pressure of the engine for being automatically opened at the beginning of the respective engine power ranges.

Figure 2:
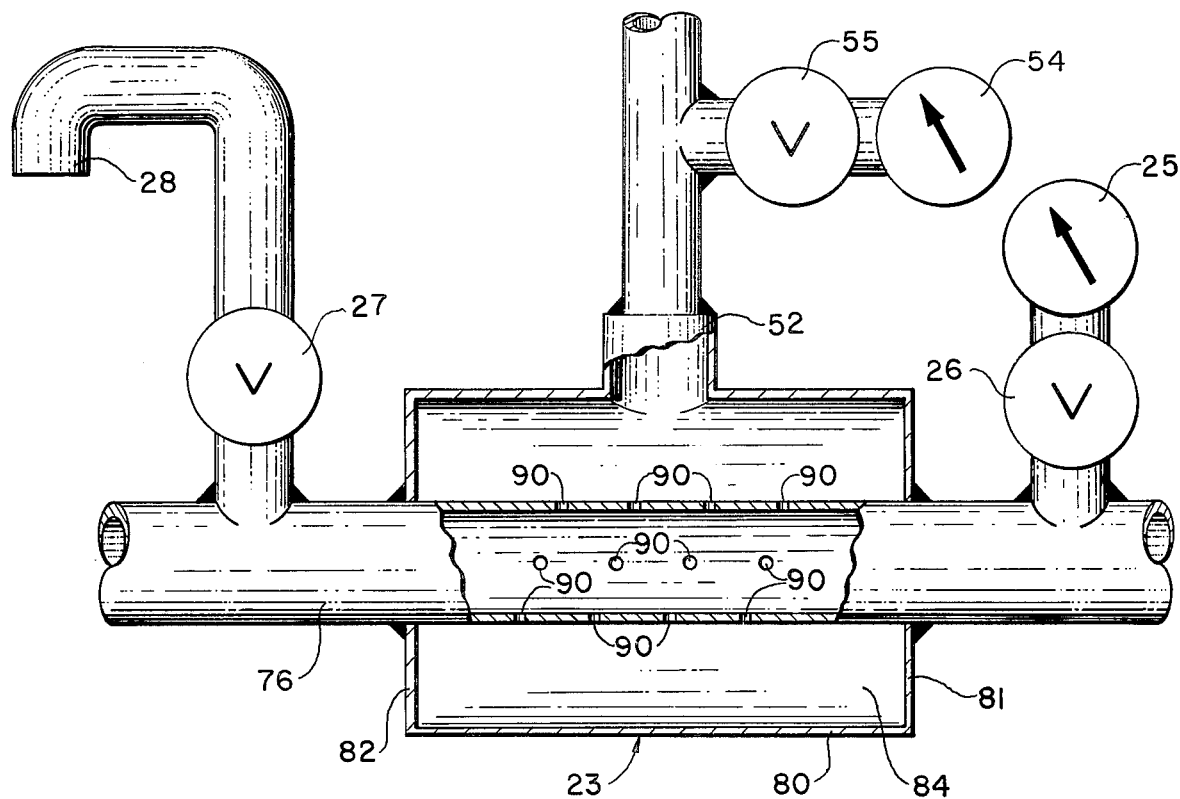
FIG. 2 is an enlarged longitudinal section view, partly broken away and partly in section, of a water and fuel mixing device of the water injection system.
Figure 3:
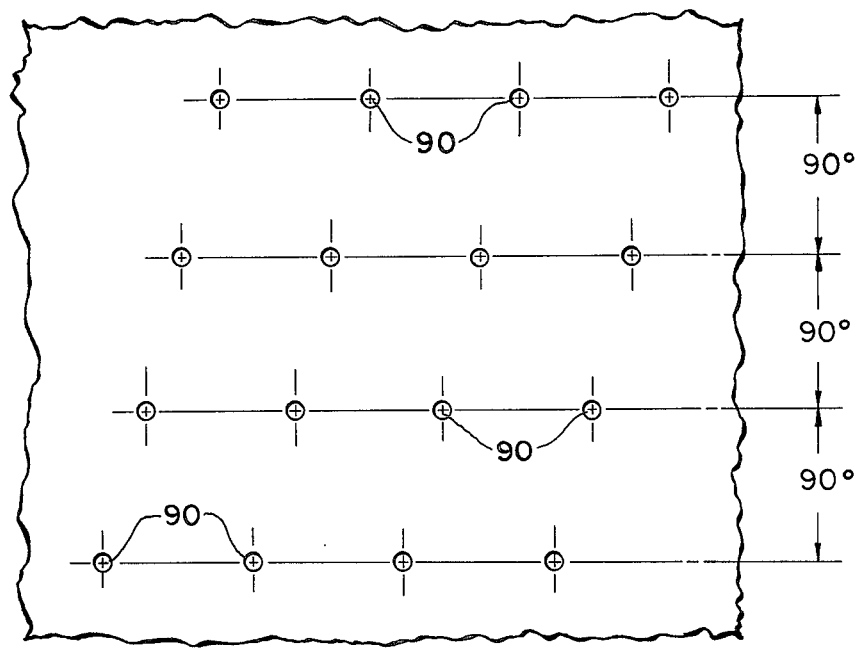
FIG. 3 is an enlarged partial layout view, partly broken away, of a water injection conduit of the mixing device.

Referring to FIGS. 2 and 3, the water/fuel mixing device 23 comprises a straight central conduit 76 having a circular opening with a cross sectional area preferably substantially equal to the circular cross sectional area of the immediately downstream section 78 of the fuel delivery conduit 30. For example, the central conduit 76 and fuel delivery conduit section 78 have an internal diameter of 1¼ inch. A generally cylindrical water jacket 80 with end walls 81, 82 provides an annular water chamber 84 surrounding an approximately 10 inch section of the central conduit 76. The mixing device inlet conduit 52 is connected to the water jacket to supply water to the annular chamber 84 from the water-metering system 34.

A plurality of radial water injection apertures or holes 90 are arranged angularly about and axially along the conduit 76 for injecting water from the annular water chamber 84 into the conduit 76 for mixing with the metered engine fuel as it is being conducted to the combustion chambers of the gas turbine engine 10. The size and number of the water injection apertures 90 depends on the fluid dynamics of the upstream water injection system and on the maximum water flow required for the maximum power setting. For example, with the water injection system described, sixteen apertures, each having a diameter of 1/16th inch are axially and angularly arranged along the water injection conduit 76. That size aperture has been found to be about optimum in being large enough to avoid being inadvertently clogged and small enough to produce a desired water jet discharge into the fuel conduit 76. The water injection apertures 90 are arranged so that no two apertures are diametrically opposed or aligned and yet preferably so that the apertures are equiangularly spaced about the water injection conduit 76 to provide a relatively even distribution of non-interfering water jets.

It has been found that an aperture arrangement as shown in FIG. 3 employing 16 apertures helically arranged along the water injection conduit 76 with 90° angular spacing and one-fourth inch axial spacing between successive apertures provides a stable homogeneous water/fuel mixture of the type desired. Thus, it is believed that the aperture arrangement provides substantially maximum water/fuel homogeniety and stability and whereby it has been found that the same cooling effect is produced in all of the combustion chambers of the gas turbine engine and a relatively low percentage of water can be used to achieve the desired combustion cooling. Accordingly, the water injection system has been found to be useful in eliminating the flame temperature spikes within the combustion chambers and thereby substantially reduce the NOX emissions in the power plant exhaust. Also, although typically carbon monoxide (CO) emission will increase with the rate of water injection at a constant engine power setting, it has been found that the water injection system of the present invention will provide for reducing the NOX emissions to an acceptable level with a relatively low percentage of water and therefore without increasing the CO emission to an unacceptable level.

As previously indicated, the diameter and cross sectional area of the water injection conduit 76 is preferably substantially the same as that of the immediately downstream section 78 of the fuel delivery conduit 30. If otherwise, it is believed that the resultant radial flow would cause some separation of the water and fuel due to their different densities.

It can be seen that the water injection apertures 90 provide for directing water jets radially into the fuel stream being conducted through the water injection conduit 76 to the engine. The diameter of each aperture 90 is established so that the water is injected as a jet across the entire conduit and to impinge against the opposite inner wall of the water injection conduit 76. The resulting water splatter provides, it is believed, for breaking the water jet into very small water droplets which then mix with the fuel to form an homogeneous water and fuel mixture. Also, it has been found that the homogeneous water and fuel mixture so produced is sufficiently stable to provide an even distribution of the mixture to all of the combustion chambers of the engine as shown by very effective and consistent cooling in all of the combustion chambers. Also, by taking a sample of the water/fuel mixture from the spout 28, it has been found that there is no visible separation of the mixture for approximately 5–10 seconds, and an undesirable water/fuel emulsion is not produced. As an emulsion would have a substantially higher viscosity than the fuel viscosity for which the engine nozzles are designed, adverse fuel nozzle operation can result. Thus, the described water injection system operates substantially ideally in producing a desired homogeneous and stable water/fuel mixture and so as not to produce an undesirable water/fuel emulsion.

Test results have shown the success of the water injection system of the present invention as a means of successfully reducing NOX emissions in an industrial gas turbine engine installation to a level of 0.3 lb./million B.T.U. without requiring modification of the engine combustion system. Pertinent test data of such a test follows:

| Engine | P&WA GG4A-4LF |
|---|---|
| Fuel Delivery Pressure | Up to 700 psi |
| Ambient Temperature | 83–93 ° F |
| Size of Water Injection Conduit 76 | 1-1/4" Dia. |
| Water Injection Apertures: | |
| Number | 16 |
| Size | 1/16" Dia. |
| Angular Spacing | 90 ° |
| Axial Spacing | 1/4" |
| Water Pressure | 875 psi |
| Industrial Base Load | 21.7 Megawatts |
| NOX Emissions | 0.3 Lb./Million B.T.U. |
| Water/Fuel Ratio | 0.360 |
| CO (Corrected to 50% excess air emission) | 120 ppm |
| Peak Load | 24.8 Megawatts |
| Water/Fuel Ratio | 0.390 |
| NOX Emissions | 0.3 Lb./Million B.T.U. |
| CO (Corrected to 50% excess air | |

| | |
|---|---|
| emission) | 100 ppm |
| Peak Reserve Load | 31.7 Megawatts |
| Water/Fuel Ratio | 0.460 |
| NOX | 0.3 Lb./Million B.T.U. |
| CO (Corrected to 50% excess air emission) | 75 ppm |

The foregoing test of the water injection system in the P & WA GG4A-4LF engine lowered NOX emissions level to the desired level (i.e. 0.3 Lb./Million B.T.U.) without modification of the engine combustion cans, manifolds and fuel nozzles, and at a significantly lower water/fuel ratio than predicted by the engine manufacturer. Accordingly, the water injection system proved to provide a significantly improved system, due, it is believed, to the formation of an homogeneous water/fuel mixture as described.

As will be apparent to persons skilled in the art, various modifications, adaptations and variations can be made from the foregoing specific disclosure without departing from the teachings of the present invention.

We claim:

1. In a gas turbine engine water injection system having a water delivery pump for delivering water under pressure and a water injection device mounted in series with a liquid fuel delivery conduit of the engine and connected to the water delivery pump for injecting water into the liquid fuel as it is conducted to the engine, the improvement wherein the water injection device comprises a water injection conduit connected in series with the liquid fuel delivery conduit, a water jacket defining a water chamber surrounding the water injection conduit and having a water inlet conduit connected to the water delivery pump for transmitting water under pressure to the water jacket chamber, the water injection conduit having an arrangement of a plurality of axially and angularly spaced non-aligned water injection apertures of generally the same size for injecting jets of water under pressure from the water jacket into the injection conduit to mix homogeneously with the fuel conducted therethrough, the water injection apertures being arranged and dimensioned and the water delivery pump being operable for delivering water under pressure for injecting jets of water under pressure through the liquid fuel within the water injection conduit and into engagement with an opposed internal surface of the conduit to be splattered thereby into a homogeneous mixture with the liquid fuel conducted through the conduit.

2. A gas turbine engine water injection system according to claim 1 wherein the water injection apertures are arranged in a generally helical pattern along the water injection conduit.

3. A gas turbine engine water injection system according to claim 1 further comprising a water metering system connected to said water jacket inlet conduit for metering water under pressure to the water jacket chamber, the water metering system comprising a plurality of parallel metering subsystems each having a metering valve for metering the water flow through the respective subsystem and an automatic on/off control valve for the respective subsystem connected to the engine for automatically opening and closing the control valve in accordance with the engine operation.

4. In a method of injecting water into a liquid fuel delivery conduit of a gas turbine engine to mix homogeneously with a liquid fuel being conducted under pressure therethrough to the gas turbine engine, comprising the steps of providing an arrangement of a plurality of axially and angularly spaced non-aligned water injection apertures in the fuel delivery conduit for injecting jets of water into the fuel delivery conduit and transversely of the direction of flow of the liquid fuel, and injecting the jets of water through the water injection apertures into the fuel delivery conduit and transversely of the direction of flow of the liquid fuel as it is conducted therethrough to the gas turbine engine, under sufficiently high pressure to inject the jets of water across the liquid fuel and into engagement with the internal surfaces of the fuel conduit to be splattered thereby to mix homogeneously with the liquid fuel as it is conducted through the conduit.

* * * * *